United States Patent [19]

Iwahashi

[11] Patent Number: 5,506,739
[45] Date of Patent: Apr. 9, 1996

[54] TAPE CASSETTE WITH SLIDABLY GUIDED, SPRING-BIASED REEL LOCKING MEANS

[75] Inventor: Yuji Iwahashi, Miyagi, Japan

[73] Assignee: Sony Corporation, Tokyo, Japan

[21] Appl. No.: 366,010

[22] Filed: Dec. 29, 1994

Related U.S. Application Data

[63] Continuation of Ser. No. 90,966, Jul. 13, 1993, abandoned.

[30] Foreign Application Priority Data

Jul. 24, 1992 [JP] Japan .................................. 4-217550

[51] Int. Cl.⁶ .................................................. G11B 23/087
[52] U.S. Cl. ........................ 360/132; 242/338.3; 242/343
[58] Field of Search .................................. 242/197, 198, 242/199, 200, 338.1, 338.3, 343, 343.1, 343.2; 360/132; 206/387

[56] References Cited

U.S. PATENT DOCUMENTS

| | | | |
|---|---|---|---|
| 4,288,048 | 9/1981 | Sieben | 242/198 |
| 4,579,295 | 4/1986 | Harada | 242/198 |
| 4,918,558 | 4/1990 | Igarashi et al. | 360/132 |
| 5,004,180 | 4/1991 | Okamura et al. | 242/198 |

FOREIGN PATENT DOCUMENTS

| | | |
|---|---|---|
| 0146311 | 5/1984 | European Pat. Off. . |
| 8805416 | 4/1988 | Germany . |
| 62-75989 | 4/1987 | Japan . |
| 2125008 | 8/1983 | United Kingdom . |

*Primary Examiner*—Stuart S. Levy
*Assistant Examiner*—William J. Klimowicz
*Attorney, Agent, or Firm*—Jay H. Maioli

[57] ABSTRACT

A tape cassette having a reel lock mechanism which includes a slider adapted to slide in frontward and rearward directions within a cassette housing; a pair of lock pawls adapted to engage with outer circumferential toothed portions of a pair of reels to lock rotation of the reels in tape slacking directions, the lock pawls being rotatably mounted on the slider; a first spring for biasing the lock pawls to rotate the same in such a direction as to engage the lock pawls with the toothed portions of the reels; a second spring for biasing the slider to slide the same in the frontward direction and drive the reels through the lock pawls in tape winding directions; and a pair of guides for rotating the lock pawls in such a direction as to disengage the lock pawls from the toothed portions against a biasing force of the first spring when the slider is slid in the rearward direction. Accordingly, when the reels are locked by the lock pawls, the reels are rotationally driven in the tape winding directions to thereby securely prevent slacking of the tape.

7 Claims, 8 Drawing Sheets

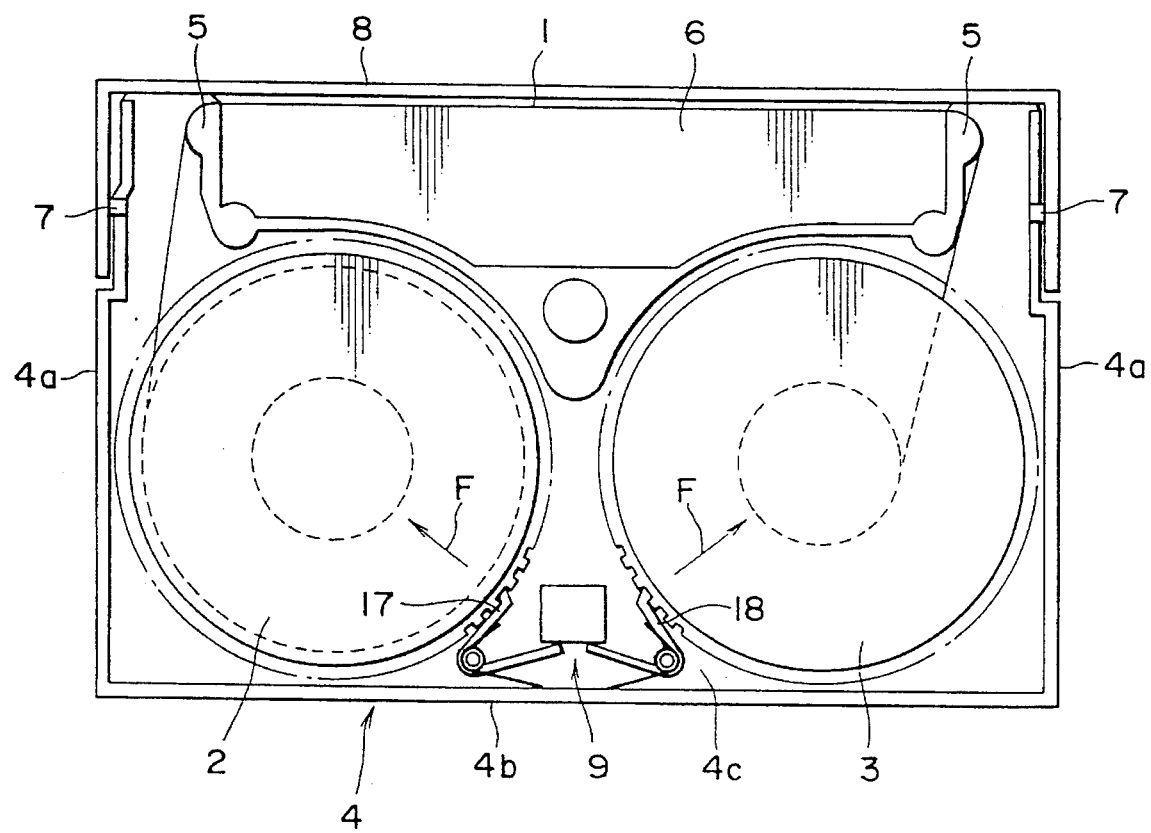

5,506,739

TAPE CASSETTE WITH SLIDABLY GUIDED, SPRING-BIASED REEL LOCKING MEANS

This is a continuation of application Ser. No. 08/090,966, filed Jul. 13, 1993, now abandoned.

BACKGROUND OF THE INVENTION

1. Field of the Invention

The present invention relates to a tape cassette such as a video tape cassette, and more particularly to a reel lock mechanism for locking a pair of reels in such a tape cassette when it is in an inoperative condition.

2. Description of the Related Art

FIGS. 6 and 7 show conventional video tape cassettes, e.g., 8 mm video tape cassettes, having different internal structures. Commonly in these video tape cassettes, a magnetic tape 1 is wound around a pair of reels 2 and 3 rotatably mounted in a cassette housing 4. The stacks of the magnetic tape 1 around the reels 2 and 3 are partially drawn and stretched between a pair of tape guides 5 for guiding the magnetic tape 1 passing along a front opening 6 of the cassette housing 4. A front lid 8 is vertically pivotably supported to a pair of support pins 7 formed on opposite side walls 4a of the cassette housing 4 at a front end portion thereof, so as to normally close the front opening 6 and cover the span of the magnetic tape 1 along the front opening 6.

A reel lock mechanism 9 is provided in a substantially triangular space defined between the reels 2 and 3 on the side of a rear wall 4b of the cassette housing 4. The reel lock mechanism 9 serves to lock rotation of the reels 2 and 3 in the opposite directions of slacking of the magnetic tape 1 as shown by arrows a and a' when the video tape cassette is ejected from a video tape recorder to become inoperative.

The details of the reel lock mechanisms 9 in the video tape cassettes shown in FIGS. 6 and 7 will be described with reference to FIGS. 8A and 8B, respectively.

First in the reel lock mechanism 9 shown in FIG. 8A, a slider 11 is engaged between a pair of ribs 10 integrally formed with a bottom plate 4c and the rear wall 4b of the cassette housing 4. The slider 11 is slidable in a frontward direction as depicted by an arrow b and a rearward direction as depicted by an arrow c. A compression coil spring 12 is interposed under compression between the slider 11 and the rear wall 4b to normally bias the slider 11 in the frontward direction b. A pair of elastic lock pawls 13 and 14 having a substantially V-shaped configuration are formed on the front surface of the slider 11. In the inoperative condition of the video tape cassette, the lock pawls 13 and 14 are engaged with outer circumferential toothed portions 15 and 16 of lower flanges 2a and 3a of the reels 2 and 3, respectively, thereby locking the rotation of the reels 2 and 3 in the directions a and a' to establish a reel lock condition.

On the other hand, in the reel lock mechanism 9 shown in FIG. 8B, a pair of lock pawls 17 and 18 each having a substantially V-shaped configuration are pivotably mounted on a pair of vertical support shafts 19 and 20 formed on the bottom plate 4c of the cassette housing 4, respectively. That is, the lock pawls 17 and 18 are rotatably about the vertical support shafts 19 and 20 in the opposite directions as depicted by arrows d and e and in the opposite directions as depicted by arrows d' and e', respectively. A pair of torsion springs 21 and 22 are mounted on the vertical support shafts 19 and 20 at the upper end portions thereof, respectively. The torsion spring 21 is engaged at one end thereof with the lock pawl 17, and the other end of the torsion spring 21 is engaged with the rear wall 4b of the cassette housing 4, thereby normally biasing the lock pawl 17 in the rotational direction d and engaging a catching end of the lock pawl 17 with the toothed portion 15 of the reel 2. Similarly, the torsion spring 22 is engaged at one end thereof with the lock pawl 18, and the other end of the torsion spring 22 is engaged with the rear wall 4b, thereby normally biasing the lock pawl 18 in the rotational direction d' and engaging a catching end of the lock pawl 18 with the toothed portion 16 of the reel 3. Accordingly, the rotation of the reels 2 and 3 in the directions a and a' is locked by the reel lock mechanism 9 to establish a reel lock condition. Further, a pair of ribs 23 serving as guides are formed on the bottom plate 4c, and an unlocking slider 24 is engaged between the ribs 23 so as to be slidable in the frontward direction b and the rearward direction c. The slider 24 is normally biased by a compression coil spring 25 in the frontward direction b. The other ends of the lock pawls 17 and 18 are in contact with the rear surface of the slider 24.

When the video tape cassette is loaded into the video tape recorder to establish an operative condition, the reel lock mechanism 9 shown in FIG. 8A is operated in such a manner that the slider 11 is retracted in the direction c against the compression coil spring 12 to thereby disengage the lock pawls 13 and 14 from the toothed portions 15 and 16, respectively, thus releasing the reel lock condition.

On the other hand, the reel lock mechanism 9 shown in FIG. 8B is operated in such a manner that the slider 24 is retracted in the direction c against the compression coil spring 25 to thereby rotate the lock pawls 17 and 18 against the torsion springs 21 and 22 in the directions e and e', respectively, and resultantly disengage the lock pawls 17 and 18 from the toothed portions 15 and 16, thus releasing the reel lock condition.

However, in the reel lock mechanism 9 shown in FIG. 8A, when the lock pawl 13 only is urged in the direction c by the toothed portion 15 of the reel 2 because of vibration, shock, etc. during transportation of the video tape cassette, there is a possibility that the other lock pawl 14 will disengage from the toothed portion 16 of the other reel 3 to cause undesirable rotation of the reel 3 in the direction b. As a result, the magnetic tape 1 as shown in FIG. 6 is prone to slack in the direction a'.

In the reel lock mechanism 9 shown in FIG. 8B, if the biasing forces of the torsion springs 21 and 22 are set to be large, so as to exhibit a sufficient reel locking performance, the reels 2 and 3 receive large sliding forces in the directions as depicted by arrows F and F' in FIG. 7 at the time the lock pawls 17 and 18 are brought into engagement with the toothed portions 15 and 16 by the torsion springs 21 and 22. As a result, the magnetic tape 1 as shown in FIG. 7 is prone to slack in the directions a and a'. In contrast therewith, if the biasing forces of the torsion springs 21 and 22 are set to be small, a sufficient reel locking performance cannot be exhibited.

SUMMARY OF THE INVENTION

It is accordingly an object of the present invention to provide a tape cassette having a reel lock mechanism which can rotationally drive a pair of reels in tape winding directions when the pair of reels are locked by a pair of lock pawls.

According to the present invention, there is provided a tape cassette comprising a cassette housing; a pair of reels rotatably mounted in said cassette housing, each of said reels having a flange formed with an outer circumferential toothed portion: a magnetic tape wound around said reels; sliding means adapted to slide in frontward and rearward directions within said cassette housing; locking means adapted to engage with said toothed portions of said reels to lock rotation of said reels in opposite directions of slacking of said magnetic tape, said locking means being rotatably mounted on said sliding means; a first spring for biasing said locking means to rotate said locking means in such a direction as to engage said locking means with said toothed portions of said reels; a second spring for biasing said sliding means to slide said sliding means in said frontward direction and drive said reels through said locking means in opposite directions of winding of said magnetic tape; and guiding means for rotating said locking means in such a direction as to disengage said locking means from said toothed portions against a biasing force of said first spring when said sliding means is slid in said rearward direction.

In locking the pair of reels, the locking means is rotated by the second spring to come into engagement with the toothed portions of the reels, thereby locking the rotation of the reels in the tape slacking directions. Then, the locking means engaging with the toothed portions is moved with the sliding means by the first spring in the frontward direction to drive the toothed portions and rotate the reels in the tape winding directions. Accordingly, every time the reel locking operation is performed, the magnetic tape can be automatically wound up to be stretched across a front opening to be closed by a front lid pivotably mounted to the cassette housing. Accordingly, in ejecting the tape cassette from a video tape recorder or the like, there is no possibility that the magnetic tape will be damaged by the front lid upon closing thereof because of slack of the magnetic tape.

The locking means is preferably constructed of a pair of lock pawls which are independent of each other. The pair of lock pawls are adapted to individually engage the toothed portions of the pair of reels, respectively. Accordingly, even when the reels are mutually fluctuated by vibration, shock, etc. during transportation of the tape cassette, the lock pawls can surely follow the reels, respectively, thereby sufficiently exhibiting a reel locking performance and reliably preventing slacking of the magnetic tape due to the vibration, shock, etc.

The first spring is preferably constructed of a single spring such as a torsion spring. Accordingly, the number of parts and the number of assembly steps can be reduced to thereby reduce the costs.

The guiding means is preferably constructed of a pair of reinforcing ribs formed on a rear wall of the cassette housing. Accordingly, the guiding means can be easily formed, and the rigidity of the cassette housing can be increased by the reinforcing ribs.

Preferably, the lock pawls have a pair of contact portions adapted to come into contact with the pair of reinforcing ribs, respectively, and the contact portions are formed in the vicinity of support shafts for rotatably supporting the lock pawls. Accordingly, the lock pawls can be largely rotated with a small stroke of the sliding means by the contact of the contact portions with the reinforcing ribs.

Other objects and features of the invention will be more fully understood from the following detailed description and appended claims when taken with the accompanying drawings.

BRIEF DESCRIPTION OF THE DRAWINGS

FIG. 7 is a schematic plan view generally showing an internal structure of a conventional video tape cassette as another example;

DETAILED DESCRIPTION OF THE PREFERRED EMBODIMENTS

Figure 1:
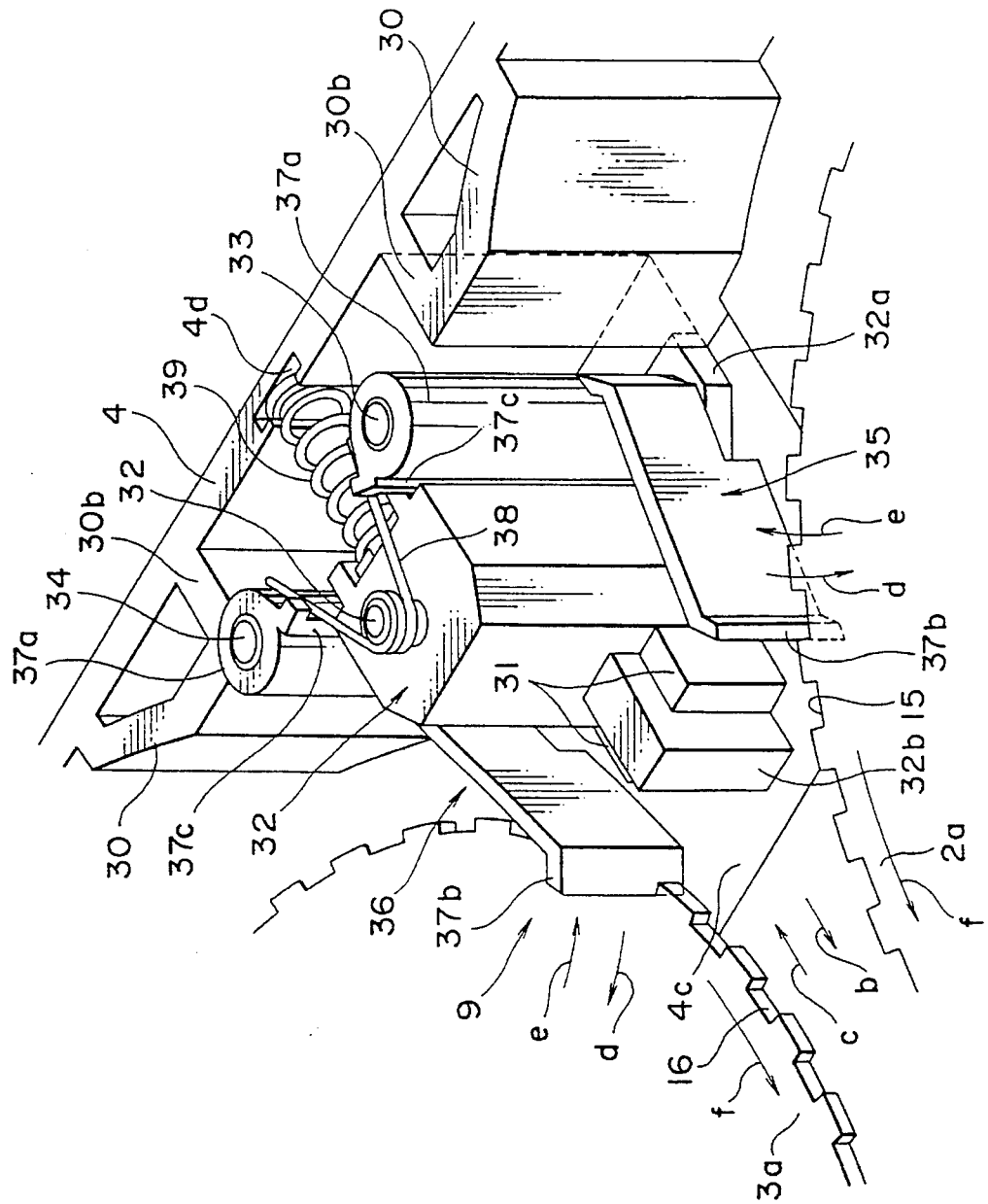
FIG. 1 is a perspective view of a reel lock mechanism in a video tape cassette according to a preferred embodiment of the present invention.
Figure 2:
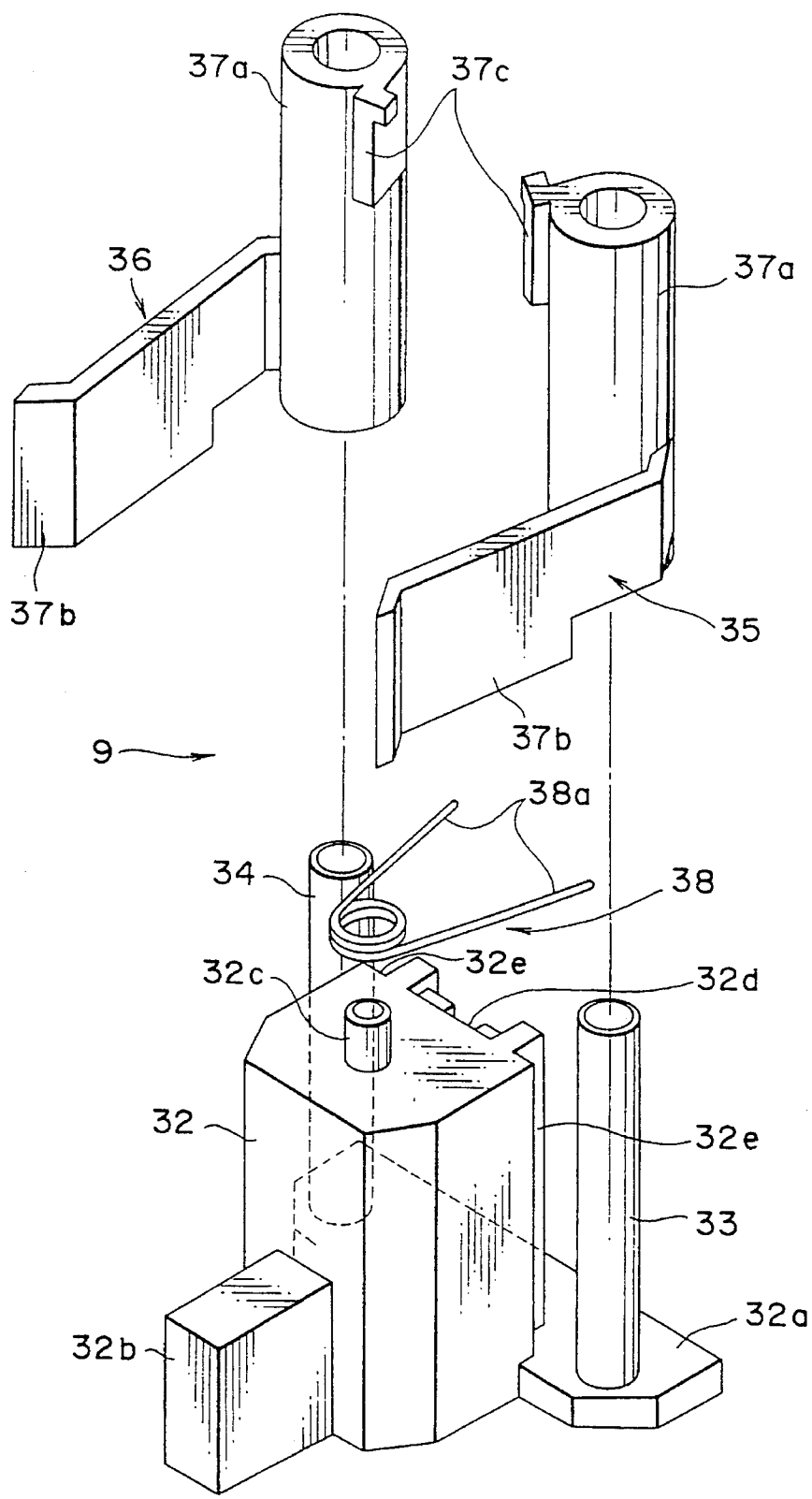
FIG. 2 is an exploded perspective view of the reel lock mechanism shown in FIG. 1.

There will now be described a preferred embodiment of the present invention as applied to a video tape cassette with reference to FIGS. 1 to 5, in which the same reference numerals as those shown in FIGS. 6 to 8B denote the same parts, and the detailed explanation thereof will be omitted as required.

Figure 5:
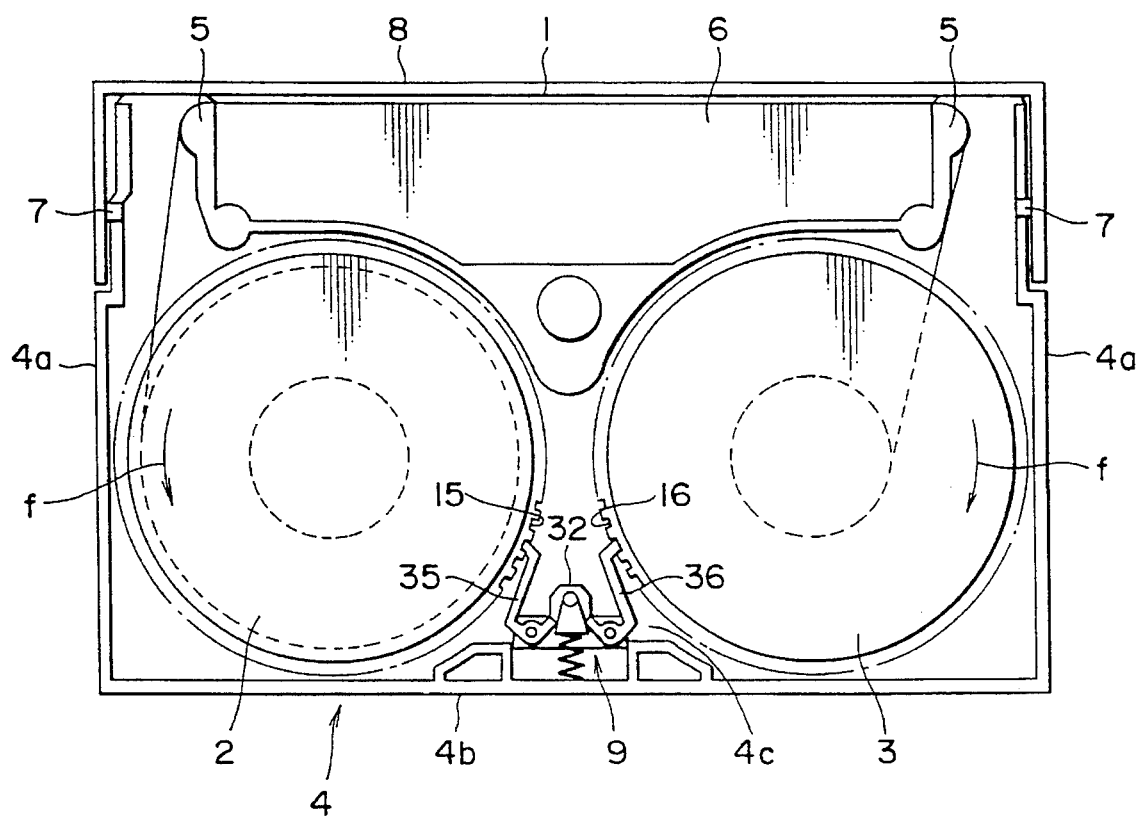
FIG. 5 is a schematic plan view generally showing an internal structure of the video tape cassette according to the preferred embodiment.
Figure 6:
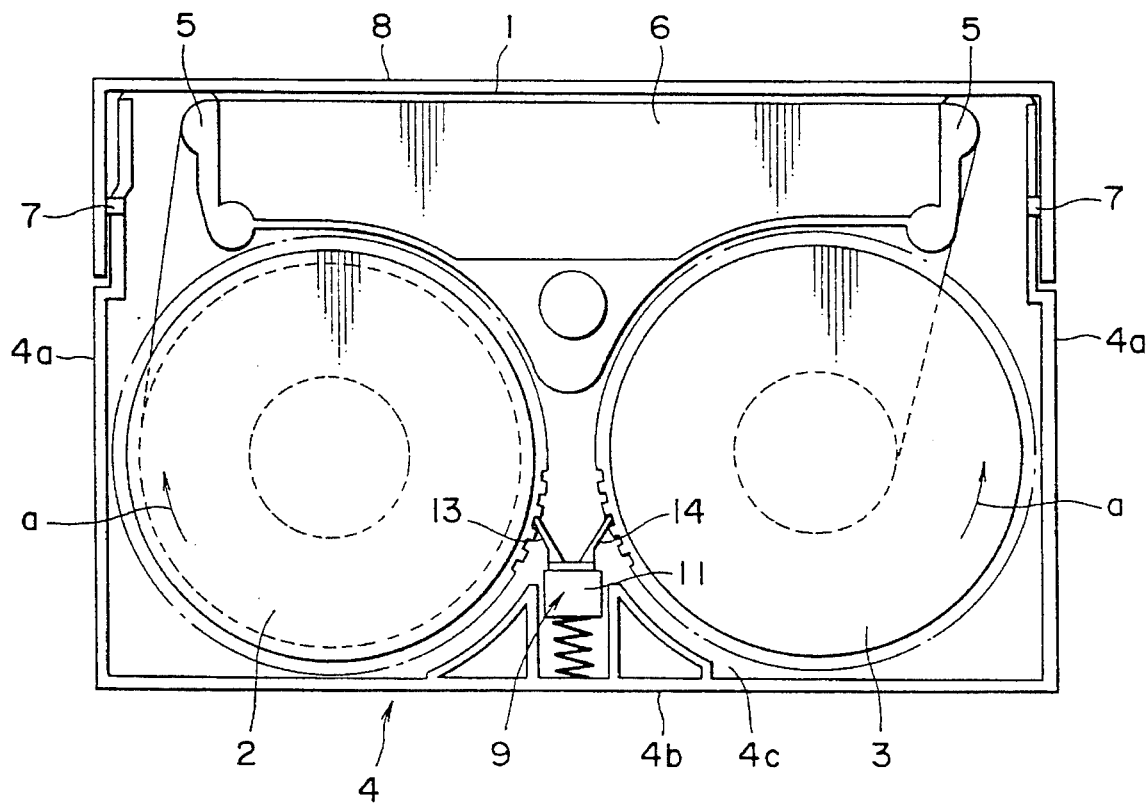
FIG. 6 is a schematic plan view generally showing an internal structure of a conventional video tape cassette as an example.
Figure 8A:
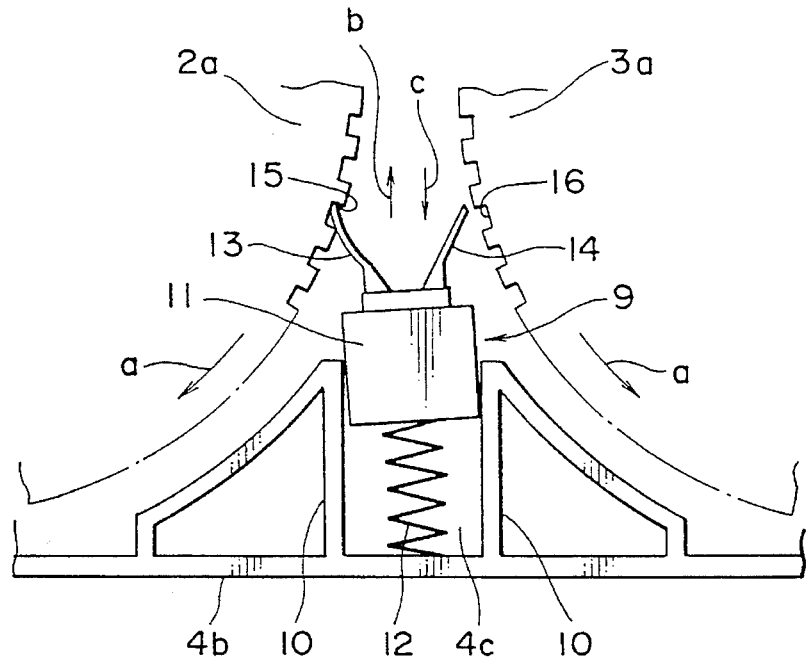
FIG. 8A is a plan view of a reel lock mechanism in the conventional video tape cassette shown in FIG. 6.
Figure 8B:
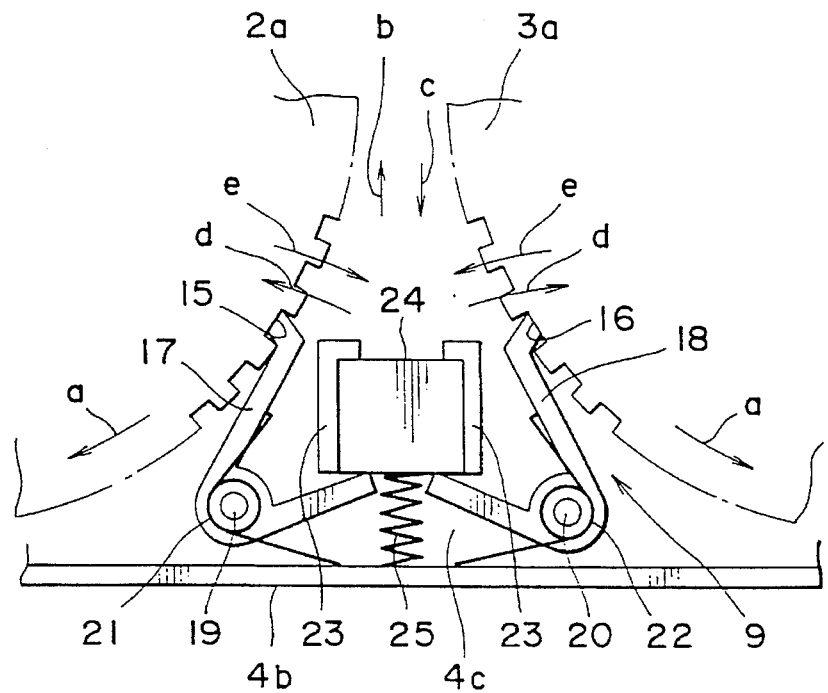
FIG. 8B is a plan view of a reel lock mechanism in the conventional video tape cassette shown in FIG. 7.

Referring to FIG. 5, there is schematically shown a video tape cassette in plan. A reel lock mechanism 9 is provided in a cassette housing 4 at the same position as that in the prior art tape cassettes shown in FIGS. 6 and 7.

The details of the reel lock mechanism 9 will be described with reference to FIGS. 1 to 4.

Figure 3:
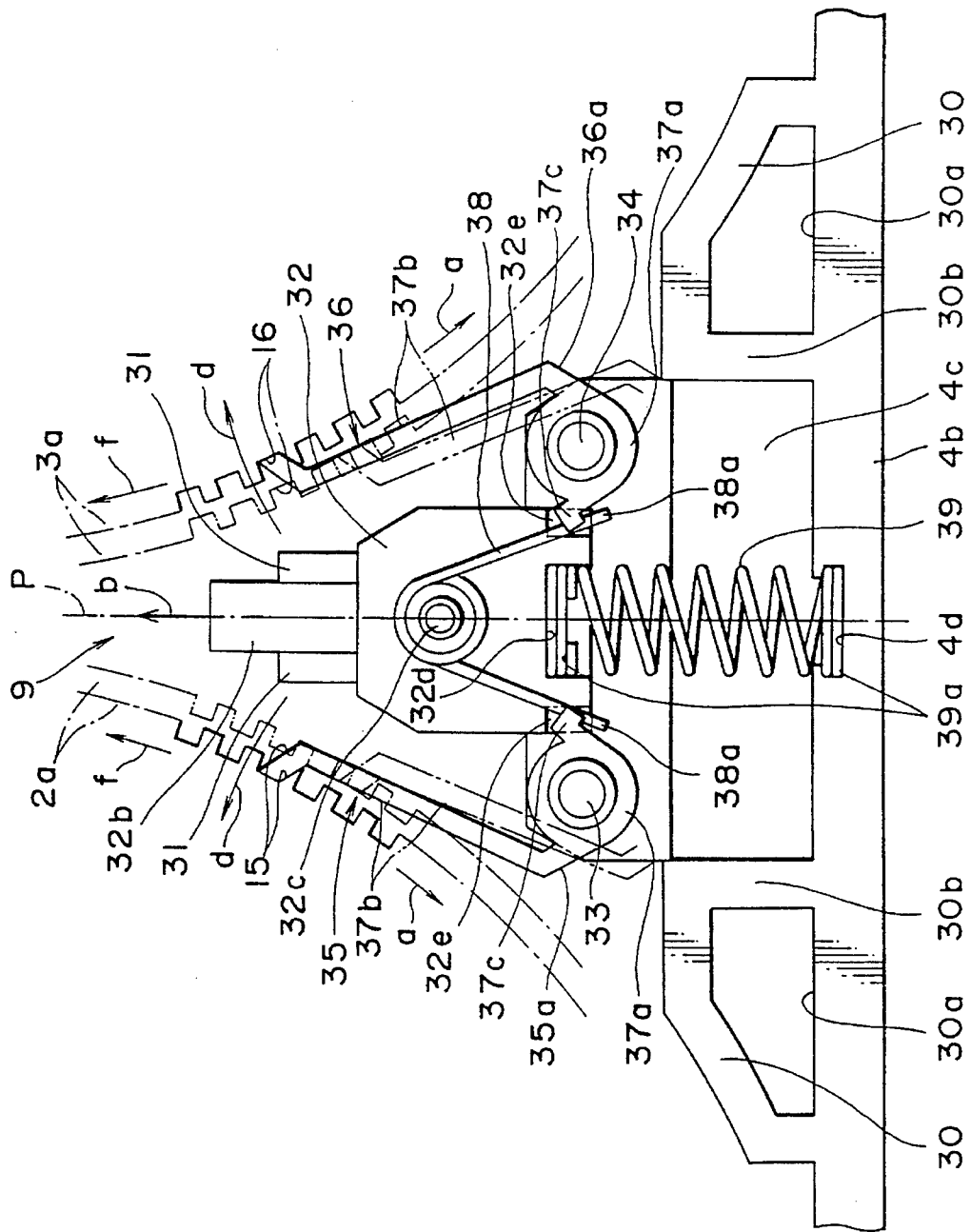
FIG. 3 is a plan view of the reel lock mechanism in a reel locking condition.
Figure 4:
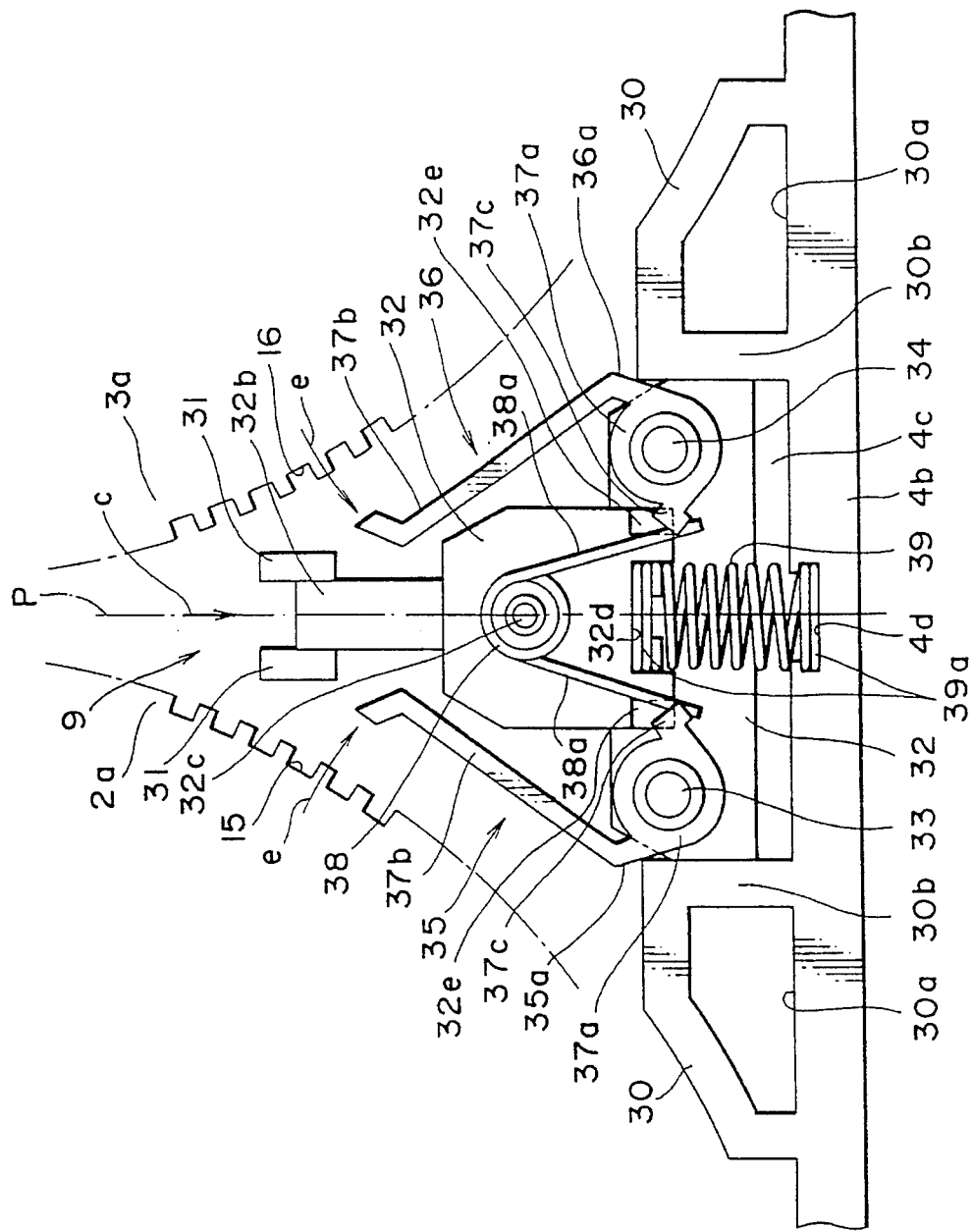
FIG. 4 is a plan view of the reel lock mechanism in a reel unlocking condition.

A pair of laterally spaced reinforcing ribs 30 each defining a closed space 30a therein are formed integrally at the corner between the inner surface of a rear wall 4b of the cassette housing 4 and the upper surface of a bottom plate 4c of the cassette housing 4. A pair of laterally spaced front guide ribs 31 are formed integrally on the bottom plate 4c at the position spaced from the rear wall 4b in the frontward direction (i.e., in the direction toward a front opening 6). As shown in FIGS. 3 and 4, the reinforcing ribs 30 are located in symmetry with respect to a lateral center P of the cassette housing 4. Similarly, the front guide ribs 31 are also located in symmetry with respect to the lateral center P. The reinforcing ribs 30 are laterally opposed at portions 30b extending in parallel to the lateral center P. These portions 30b serve as a pair of rear guide ribs for a slider 32.

The slider 32 is integrally formed with a base plate 32a and a front projection 32b. The slider 32 is slidably mounted on the bottom plate 4c so as to be movable in the frontward and rearward directions as depicted by arrows b and c, and is guided by the pair of front guide ribs 31 and the pair of rear guide ribs 30b of the cassette housing 4 in such a manner that the front projection 32b is slidably engaged between the front guide ribs 31 and the base plate 32a is slidably engaged between the rear guide ribs 30b. The slider 32 is further integrally formed with a pair of laterally spaced support shafts 33 and 34 extending vertically upwardly from the upper surface of the base plate 32a at the laterally distant portions thereof.

A pair of lock pawls 35 and 36 are pivotably supported on the pair of support shafts 33 and 34, respectively. The pair of lock pawls 35 and 36 are shaped symmetrically with respect to the lateral center P. Each of the lock pawls 35 and 36 is integrally formed with a cylindrical portion 37a in which the corresponding one of the support shafts 33 and 34 is inserted, a relatively long lock arm 37b projecting from the outer circumferential surface of the cylindrical portion 37a at the lower portion thereof, and a relatively short projection 37c projecting from the outer circumferential surface of the cylindrical portion 37a at the upper portion thereof in a diametrically opposite relationship with respect to the lock arm 37b. Thus, the lock pawls 35 and 36 are adapted to swing about the support shafts 33 and 34 in opposite directions as depicted by arrows d and e and in opposite directions as depicted by arrows d' and e', respectively.

The slider 32 has a top surface integrally formed with a spring mounting pin 32c lying on the lateral center P. A torsion spring 38 as a first spring is mounted on the outer circumference of the spring mounting pin 32c of the slider 32. The torsion spring 38 has opposite end portions 38a resiliently engaging with the projections 37c of the lock pawls 35 and 36, so that the lock pawls 35 and 36 are normally biased by the opposite end portions 38a of the torsion spring 38 in the rotational directions d and d' so as to engage with toothed portions 15 and 16 formed on the outer circumferences of lower flanges 2a and 3a of a pair of reels 2 and 3, respectively.

The slider 32 has a rear surface formed with a recess 32d lying on the lateral center P, and the rear wall 4b of the cassette housing 4 is formed with a recess 4d lying on the lateral center P. A compression coil spring 39 as a second spring is interposed under compression between the two recesses 32d and 4d in such a manner that opposite ends 39a of the spring 39 are engaged with the recesses 32d and 4d, so that the slider 32 is normally biased by the spring 39 in the frontward direction b. A sliding force of the slider 32 in the direction b by the second spring 39 is previously set to be larger than a rotating force of the lock pawls 35 and 36 in the directions d and d' by the first spring 38.

The lock pawls 35 and 36 have contact surfaces 35a and 36a adapted to come into contact with the rear guide ribs 30b, respectively. The contact surfaces 35a and 36a are formed in the vicinity of the respective support shafts 33 and 34 for the lock pawls 35 and 36. The contact surfaces 35a and 36a are inclined with respect to the outside surfaces of the respective lock arms 37b of the lock pawls 35 and 36. Further, a pair of rotation stoppers 32e are formed at the rear corner portions of the slider 32 to restrict the rotation of the projections 37c of the lock pawls 35 and 36 in the directions d and d'.

Now, the reel locking operation and the reel unlocking operation of the reel lock mechanism 9 will be described.

When the video tape cassette is loaded into a video tape recorder (not shown) to establish an operative condition as shown in FIG. 4, the slider 32 is retracted in the direction c to an unlocking portion against the second spring 39, and simultaneously the lock pawls 35 and 36 are also retracted in the direction c by the slider 32.

During this retraction, the contact surfaces 35a and 36a of the lock pawls 35 and 36 come into contact with the rear guide ribs 30b, respectively, thereby rotating the lock pawls 35 and 36 about the support shafts 33 and 34 in the directions e and e' against the first spring 38. As a result, the catching ends of the lock arms 37b of the lock pawls 35 and 36 disengage from the toothed portions 15 and 16 of the reels 2 and 3 in the directions e and e', thus unlocking the reels 2 and 3. Since the contact surfaces 35a and 36a are formed in the vicinity of the support shafts 33 and 34, the lock pawls 35 and 36 can be largely rotated in the directions e and e' with a small stroke of the slider 32 in the direction c.

Conversely, when the video tape cassette is ejected from the video tape recorder to establish an inoperative condition as shown in FIG. 3, the slider 32 is advanced in the direction b to a locking portion by the second spring 39, and simultaneously the lock pawls 35 and 36 are also advanced in the direction b by the slider 32.

During this advance, the contact surfaces 35a and 36a of the lock pawls 35 and 36 first come away from the rear guide ribs 30b in the direction b. At the same time, the lock pawls 35 and 36 are rotated about the support shafts 33 and 34 in the directions d and d' by the first spring 38 until the catching ends of the lock arms 37b come into engagement with the toothed portions 15 and 16 of the reels 2 and 3 as shown by phantom lines in FIG. 3. As a result, the rotation of the reels 2 and 3 in the tape slacking directions as depicted by arrows a and a' is locked to establish a reel locking condition.

Then, the lock pawls 35 and 36 are further advanced in the direction b by the slider 32 with the above reel locking condition maintained as shown by solid lines in FIG. 3. As a result, the toothed portions 15 and 16 of the reels 2 and 3 are driven in the tape winding directions as depicted by arrows f and f' by the lock arms 37b of the lock pawls 35 and 36. Thus, the reels 2 and 3 are rotated in the directions f and f', respectively.

Accordingly, the reel lock mechanism 9 operates to rotationally drive the reels 2 and 3 in the tape winding directions f and f' as shown in FIG. 5, thereby completing the reel locking condition. Therefore, a magnetic tape 1 can be automatically wound up around the reels 2 and 3 to thereby remove the slack of the magnetic tape 1 and apply a tension to the magnetic tape 1 between a pair of laterally spaced tape guides 5.

The lock pawls 35 and 36 in the reel lock mechanism 9 are independent of each other, and they operate to individually lock the reels 2 and 3 in the reel lock completed condition as shown by the solid lines in FIG. 3. Accordingly, even when the reels 2 and 3 are mutually fluctuated by vibration, shock, etc. during transportation of the video tape cassette, the lock pawls 35 and 36 can surely follow the reels 2 and 3 to rotate in the directions d and e and the directions d' and e', respectively. Thus, the reel lock performance can be always sufficiently exhibited.

Further, even when a rotating force is applied to the reels 2 and 3 in the directions a and a' to cause rotation of the lock pawls 35 and 36 in the directions d and d' in the reel lock completed condition as shown by the solid lines in FIG. 3, the projections 37c of the lock pawls 35 and 36 abut against the rotation stoppers 32e of the slider 32, so that the rotation of the lock pawls 35 and 36 in the directions d and d' is stopped. Accordingly, the catching ends of the lock arms 37b of the lock pawls 35 and 36 are prevented from disengaging from the toothed portions 15 and 16. Thus, the slack of the magnetic tape 1 due to the rotation of the reels 2 and 3 in the directions a and a' can be prevented.

Although the reel lock mechanism 9 mentioned above is applied to the video tape cassette in the preferred embodiment, it may be applied to various tape cassettes according to the present invention.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A tape cassette comprising:

a cassette housing;

a pair of reels rotatably mounted in said cassette housing, each of said reels having a flange formed with an outer circumferential toothed portion;

a magnetic tape wound around and extending between said pair of reels;

sliding means mounted in said cassette housing slidably in a frontward direction and a rearward direction within said cassette housing, said sliding means comprising a base plate and a front projection;

locking means engageable with said toothed portions of said reels to lock rotation of said reels in directions opposite to directions in which said magnetic tape would slacken, said locking means comprising a pair of lock pawls independently rotatably mounted on said base plate of said sliding means, each of said pair of lock pawls comprising a cylindrical portion, a contact surface, a lock arm projecting from a cylindrical surface of said cylindrical portion and having a catching end at a distal end thereof engageable with said toothed portion of said reel, and a spring projection projecting from said cylindrical surface of said cylindrical portion in a diametrically opposite relationship to said lock arm;

a first spring mounted on said sliding means for engaging said spring projection of each of said pair of lock pawls for biasing said pair of lock pawls to rotate in a direction such that each lock arm of said pair of lock pawls engages said toothed portion of each of said reels;

a second spring disposed in said cassette housing for biasing said sliding means to slide in said frontward direction and to drive said reels through said locking means in opposite directions corresponding to directions of winding of said magnetic tape on said pair of reels;

first guiding means comprising a pair of laterally spaced reinforcing ribs mounted at a rear side of said cassette housing and defining a space therebetween for accommodating said base plate of said sliding means, said reinforcing ribs engageable with the contact surfaces of said locking means for rotating said locking means in such a direction as to disengage said each lock arm from said toothed portions against a biasing force of said first spring when said sliding means is slid in said rearward direction and for guiding a sliding movement of said base plate of said sliding means; and second guiding means comprising a pair of laterally spaced guide ribs mounted in said cassette housing forward of said first guiding means and defining a space therebetween for accommodating said front projection of said sliding means for guiding a sliding movement of said front projection of said sliding means.

2. The tape cassette as defined in claim 1, wherein said first spring comprises a single spring.

3. The tape cassette as defined in claim 1, wherein said base plate of said sliding means engages said second spring, and wherein said sliding means further comprises a pair of support shafts projecting upwardly from said base plate, each of said support shafts being loosely inserted in said cylindrical portion of each of said lock pawls.

4. The tape cassette as defined in claim 3, wherein said contact surface of said each lock pawl is formed in the vicinity of said support shaft supporting said each lock pawl.

5. The tape cassette as defined in claim 3, wherein said base plate includes a pair of stoppers adapted to abut said spring projections of said lock pawls to stop rotation of said lock pawls.

6. The tape cassette as defined in claim 1, wherein said contact surface of said each lock pawl comprises a surface inclined with respect to said lock arm.

7. The tape cassette as defined in claim 1, wherein a sliding force of said sliding means generated by said second spring is larger than a rotating force of said locking means generated by said first spring.

* * * * *

UNITED STATES PATENT AND TRADEMARK OFFICE
CERTIFICATE OF CORRECTION

PATENT NO. : 5,506,739
DATED : April 09, 1996
INVENTOR(S) : Yuji Iwahashi

It is certified that error appears in the above-identified patent and that said Letter Patent is hereby corrected as shown below:

Col.1, line 60, change "rotatably" to --rotatable--
Col.5, line 58, change "portion" to --position--

Col.7, line 13, change "slidably" to --slidable--

Signed and Sealed this

Twenty-eighth Day of October, 1997

Attest:

BRUCE LEHMAN

*Attesting Officer*           *Commissioner of Patents and Trademarks*